(12) United States Patent
Mochizuki et al.

(10) Patent No.: US 11,211,842 B2
(45) Date of Patent: Dec. 28, 2021

(54) INNER-ROTOR MOTOR WITH URGING STRUCTURE

(71) Applicant: MINEBEA MITSUMI Inc., Nagano (JP)

(72) Inventors: Hiroaki Mochizuki, Matsue (JP); Minoru Kuroda, Sakaiminato (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 16/826,755

(22) Filed: Mar. 23, 2020

(65) Prior Publication Data

US 2020/0220420 A1 Jul. 9, 2020

Related U.S. Application Data

(63) Continuation of application No. 15/376,127, filed on Dec. 12, 2016, now Pat. No. 10,903,713.

(30) Foreign Application Priority Data

Dec. 25, 2015 (JP) ................................ 2015-254464

(51) Int. Cl.
*H02K 5/16* (2006.01)
*H02K 5/167* (2006.01)
*H02K 7/08* (2006.01)

(52) U.S. Cl.
CPC ........... *H02K 5/161* (2013.01); *H02K 5/1672* (2013.01); *H02K 7/083* (2013.01)

(58) Field of Classification Search
CPC ...... H02K 5/161; H02K 5/1672; H02K 7/083; H02K 13/006
USPC ........................................................ 310/90
See application file for complete search history.

(56) References Cited

U.S. PATENT DOCUMENTS

| | | | |
|---|---|---|---|
| 3,626,220 A | 12/1971 | Niculescu |
| 3,665,758 A | 5/1972 | Tiller |
| 4,152,614 A | 5/1979 | Noguchi et al. |
| 4,510,405 A | 4/1985 | Carroll et al. |

(Continued)

FOREIGN PATENT DOCUMENTS

| CN | 102089959 A | 6/2011 |
|---|---|---|
| CN | 202197206 U | 4/2012 |

(Continued)

OTHER PUBLICATIONS

Received STIC search report from searcher Haoyi Chen dated Mar. 19, 2021. (Year: 2021).*

(Continued)

*Primary Examiner* — Shawki S Ismail
*Assistant Examiner* — Htet Z Kyaw
(74) *Attorney, Agent, or Firm* — Pearne & Gordon LLP

(57) ABSTRACT

An inner-rotor motor including: an armature assembly including a rotating shaft, an armature unit coupled to the rotating shaft and a pressing unit; a frame assembly including a frame housing the armature unit, a first bearing unit located on one side with respect to the armature unit in an axial direction, and a second bearing unit located on another side with respect to the armature unit in the axial direction; and an urging structure that urges the rotating shaft in a direction away from the second bearing unit and that presses the pressing unit toward the first bearing unit.

7 Claims, 4 Drawing Sheets

(56) References Cited

U.S. PATENT DOCUMENTS

| | | |
|---|---|---|
| 4,598,220 A | 7/1986 | Stone |
| 4,720,647 A | 1/1988 | Plumer |
| 6,032,336 A | 3/2000 | Fujiwara |
| 6,164,833 A | 12/2000 | Kai et al. |
| 6,273,221 B1 | 8/2001 | Schmidt |
| 6,356,004 B1 | 3/2002 | Porter et al. |
| 6,376,948 B1 | 4/2002 | Wang |
| 6,459,182 B1 | 10/2002 | Pfann et al. |
| 6,617,728 B1 | 9/2003 | Wang |
| 6,853,104 B2 | 2/2005 | Shiraki et al. |
| 7,237,962 B2 | 7/2007 | Zernikow et al. |
| 7,538,461 B2 | 5/2009 | McMillan et al. |
| 2001/0008353 A1 | 7/2001 | Kuivamaki |
| 2003/0057793 A1 | 3/2003 | Yang |
| 2003/0155825 A1 | 8/2003 | Shiraki et al. |
| 2005/0174002 A1 | 8/2005 | Sesselmann et al. |
| 2006/0043817 A1 | 3/2006 | Nagai et al. |
| 2006/0082234 A1 | 4/2006 | Tsukamoto |
| 2007/0138884 A1 | 6/2007 | McMillan et al. |
| 2009/0224617 A1 | 9/2009 | Bottger et al. |
| 2009/0224626 A1 | 9/2009 | Eppler et al. |
| 2010/0192328 A1 | 8/2010 | Scheck et al. |
| 2011/0187215 A1 | 8/2011 | Sahara et al. |
| 2012/0038231 A1 | 2/2012 | Oda et al. |
| 2012/0043862 A1 | 2/2012 | Furukawa et al. |
| 2013/0221783 A1 | 8/2013 | Okamura |
| 2013/0334908 A1 | 12/2013 | Asano |
| 2014/0224045 A1 | 8/2014 | Kummer |
| 2014/0232303 A1 | 8/2014 | Simofi-Ilyes et al. |
| 2014/0300219 A1 | 10/2014 | Yamamoto |
| 2015/0008783 A1 | 1/2015 | Kitaji et al. |
| 2015/0084461 A1 | 3/2015 | Furukawa et al. |
| 2015/0130306 A1 | 5/2015 | Kitamura et al. |
| 2017/0179784 A1 | 6/2017 | Nishidate |
| 2018/0219453 A1 | 8/2018 | Kuhn et al. |

FOREIGN PATENT DOCUMENTS

| | | | |
|---|---|---|---|
| CN | 103078440 A | 5/2013 | |
| CN | 104104207 A | 10/2014 | |
| DE | 94 07 336 U1 | 10/1995 | |
| DE | 299 01 512 U1 | 6/1999 | |
| DE | 10 2007 039 239 A1 | 7/2009 | |
| DE | 102008061117 A1 | 6/2010 | |
| DE | 20 2012 011 018 U1 | 1/2013 | |
| DE | 20 2015 107 053 U1 | 2/2016 | |
| EP | 0360 779 A2 | 3/1990 | |
| EP | 1 011 188 A1 | 6/2000 | |
| EP | 1 940 012 A1 | 7/2008 | |
| EP | 2 192 675 A1 | 6/2010 | |
| EP | 2 202 377 A1 | 6/2010 | |
| EP | 2 543 808 A1 | 1/2013 | |
| GB | 2 054 759 A | 2/1981 | |
| JP | 49-095406 U1 | 12/1972 | |
| JP | 58-169233 U | 11/1983 | |
| JP | 60-216738 A | 10/1985 | |
| JP | 01-040254 U1 | 3/1989 | |
| JP | 4-47367 U | 4/1992 | |
| JP | 09-149621 A | 6/1997 | |
| JP | H10-150762 A | 6/1998 | |
| JP | 11-113209 A | 4/1999 | |
| JP | 2000-354359 A | 12/2000 | |
| JP | 2001-320856 A | 11/2001 | |
| JP | 2002-529667 A | 9/2002 | |
| JP | 3397767 B2 | 2/2003 | |
| JP | 2005-240706 A | 9/2005 | |
| JP | 2007-247663 A | 9/2007 | |
| JP | 2007-252130 A | 9/2007 | |
| JP | 2010-011531 A | 1/2010 | |
| JP | 2010-533092 A | 10/2010 | |
| JP | 2011-211825 A | 10/2011 | |
| JP | 52-26102 U | 7/2013 | |
| JP | 5357870 B2 | 9/2013 | |
| JP | 2014-003832 A | 1/2014 | |
| JP | 2014-523497 A | 9/2014 | |
| JP | 2014-212686 A | 11/2014 | |
| JP | 2017-518024 A | 6/2017 | |
| KR | 20070050745 * | 5/2007 | ............... H02K 5/16 |
| WO | 2003/105315 A1 | 12/2003 | |

OTHER PUBLICATIONS

Chinese Office Action dated Mar. 12, 2020 for corresponding Chinese Application No. 201611150051.8 and English translation.
Notification of Reasons for Refusal dated Feb. 20, 2018 in the corresponding Japanese Application No. 2015-254464 and English translation.
Notification of Reasons for Refusal dated Aug. 7, 2018 in the corresponding Japanese Application No. 2015-254464.
Chinese Office Action dated Jun. 5, 2019 for corresponding Chinese Application No. 201611150051.8 and English translation.
Japanese Office Action dated Nov. 19, 2019 for corresponding Japanese Application No. 2019-008262 and English translation.
Japanese Office Action dated Mar. 17, 2020 for corresponding Japanese Application No. 2019-008262 and English translation.
Notice of Reasons for Refusal dated May 25, 2021 for corresponding Japanese Application No. 2020-124400 and English translation.

* cited by examiner

[FIG. 1]
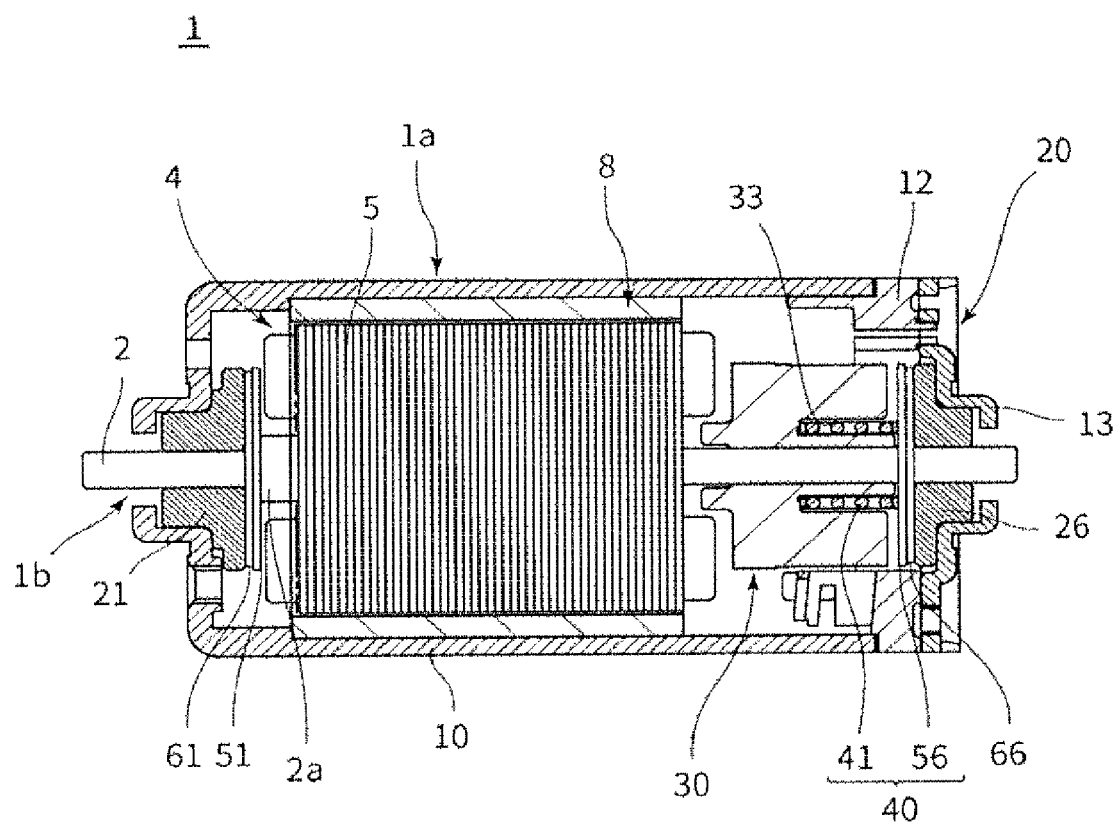

[FIG. 2]
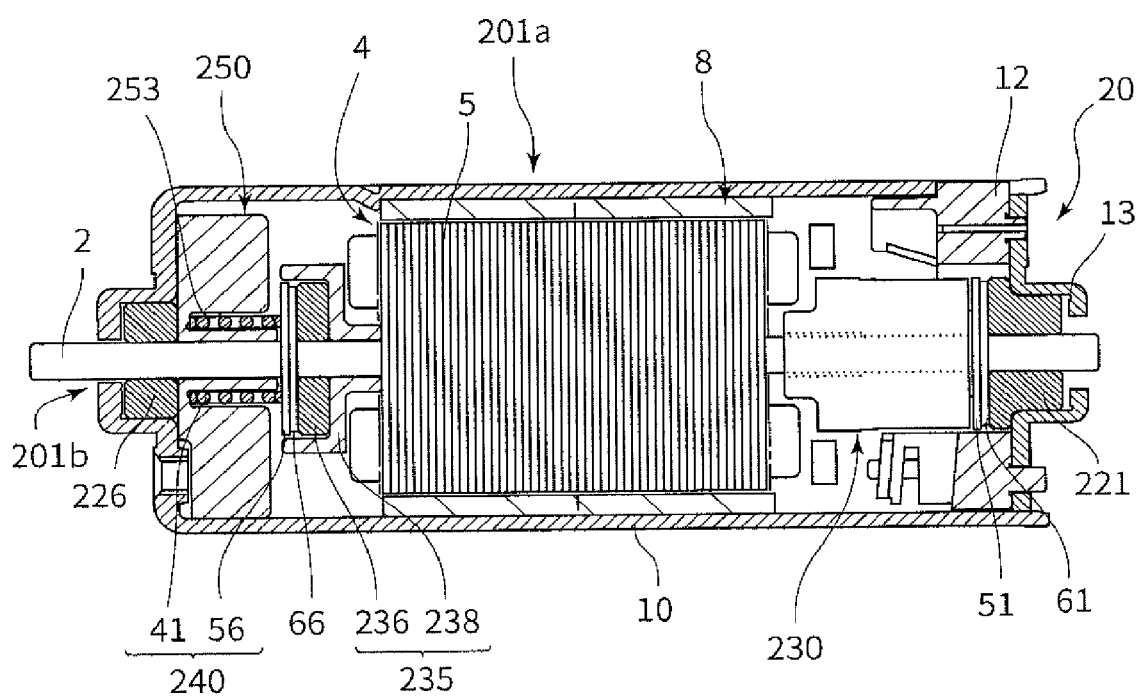

[FIG. 3]
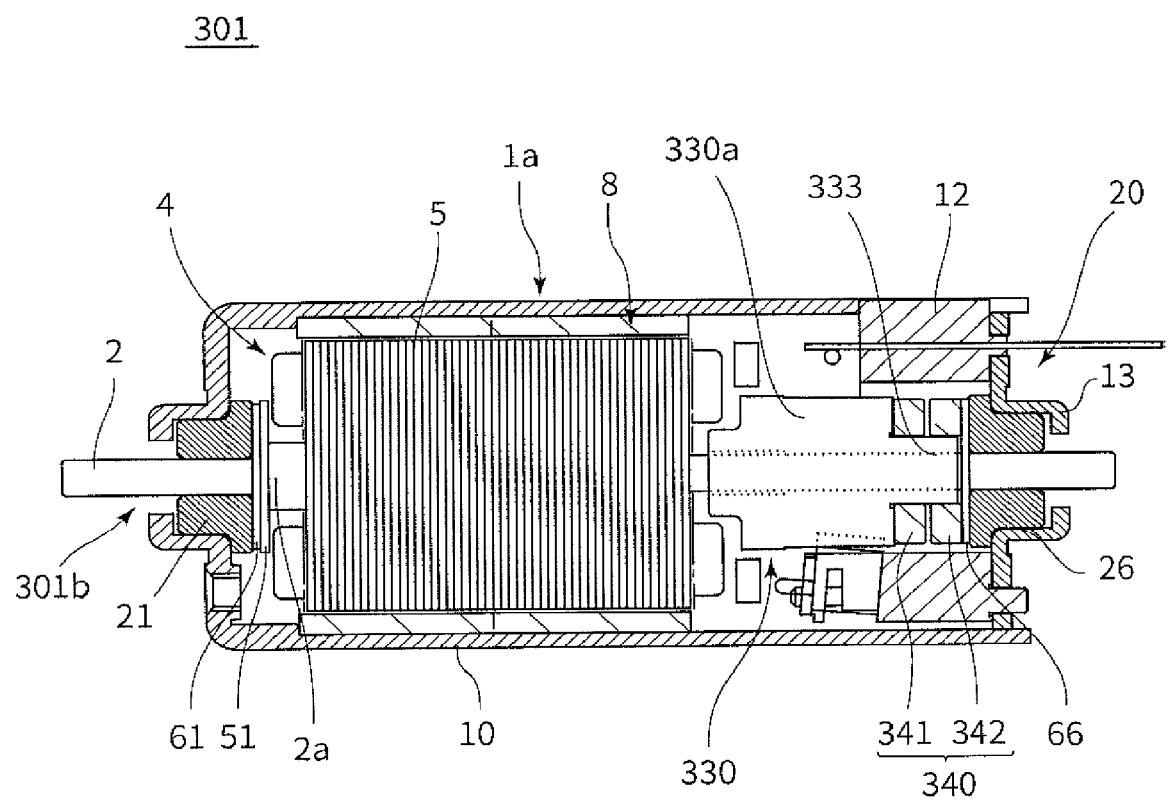

[FIG. 4]
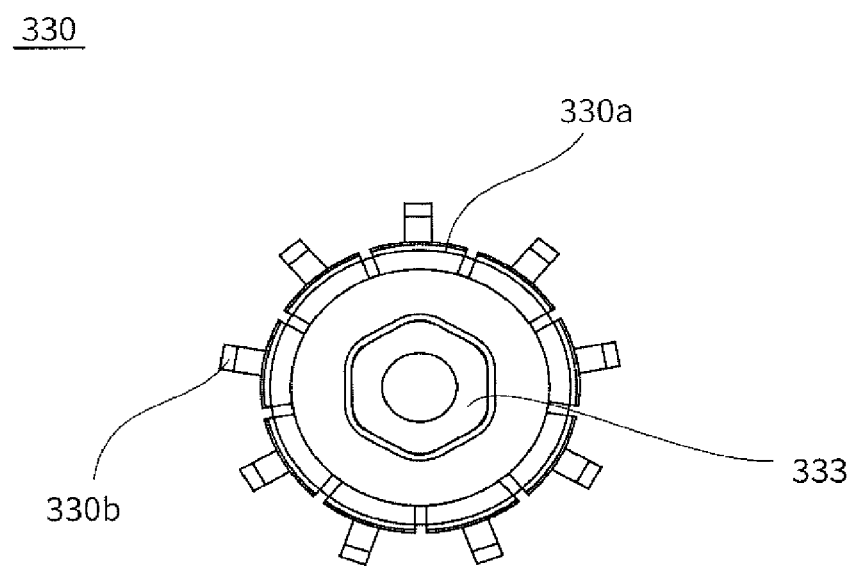

INNER-ROTOR MOTOR WITH URGING STRUCTURE

CROSS REFERENCE TO RELATED APPLICATIONS

This is a continuation application of U.S. patent application Ser. No. 15/376,127, filed on Dec. 12, 2016, which claims priority of Japanese Patent Application No. 2015-254464, filed on Dec. 25, 2015. The contents of these applications are hereby incorporated by reference in their entireties.

BACKGROUND

Technical Field

The present disclosure relates to an inner-rotor motor, and particularly to an inner-rotor motor capable of maintaining a rotational position.

Background Art

Inner-rotor motors are widely used as drive sources of, for example, office machines and home appliances. Some inner-rotor motors of this type are used for applications that require a rotational position of a device coupled to the rotating shaft of a motor to be maintained.

Japanese Unexamined Patent Application Publication No. 2001-320856 discloses a structure of an inner-rotor electric motor in which fixed and movable braking members providing a braking operation are built inside the casing and a stop holding torque can be obtained when power is not applied. With this structure, the brake is activated when power is not applied by an attraction force caused by a difference in a position of a magnetic center of a magnet on the casing side and a position of a center of a rotor in an axial direction.

Japanese Unexamined Patent Application Publication No. 10-150762 discloses a structure of an apparatus provided with a multi-polarized magnet having a plurality of magnetic poles on one of the rotor side and the stator side on an outer side of a motor frame. On the other of the rotor side and the stator side, a multi-polarized magnet in which a plurality of polarization portions and hysteresis portions are both formed such that the multi-polarized magnets face each other. Such an apparatus is capable of obtaining a braking force and a holding force.

Japanese Unexamined Patent Application Publication No. 2011-211825 discloses a structure of a valve opening-closing apparatus used in, for example, an exhaust gas recirculating apparatus. The valve opening-closing apparatus has a valve closing return spring therein.

DE 10 2008 061 117 A1 discloses a structure of a spindle driving apparatus having a built-in brake device in which a brake coil spring is arranged in an outer region with respect to an axial direction of a motor.

With an apparatus (a set) as described above in which a member is displaced using an inner-rotor motor, in the case where a rotational position of the motor corresponding to a position of the member needs to be held, a holding mechanism is generally provided near the member, which is a member of interest, in the set. However, with a set having a configuration in which a rotation speed of a motor is reduced using a speed reduction mechanism particularly including gears and so on and then a member is displaced, in the case where a holding mechanism is provided after the speed reduction mechanism subsequent to the motor, the holding mechanism needs to apply a strong holding force. In such a case, a massive holding mechanism in terms of size and configuration needs to be provided, and thus the size and manufacturing cost of a set using the inner-rotor motor may be increased.

In the case where a brake mechanism is provided inside a motor as described in Japanese Unexamined Patent Application Publication No. 2001-320856, the holding force of the motor is amplified by a speed reduction ratio, and thus a holding mechanism can be simplified. However, the structure as described in Japanese Unexamined Patent Application Publication No. 2001-320856 includes a large number of parts, and is complicated with a divider provided inside the motor, thereby causing a problem in that the manufacturing cost increases. Furthermore, since the magnetic thrust force of the rotor is the only force generating a friction holding force when power is not applied, it is difficult to obtain a high holding force. In the case where acquisition of a high holding force is desired, a strong magnet needs to be used, thereby causing a problem in that use of such a strong magnet is disadvantageous in terms of cost.

The structure as described in Japanese Unexamined Patent Application Publication No. 10-150762 has magnets or the like provided outside the motor, thereby causing a problem that the structure is difficult to work with. Moreover, one of the magnets needs to have an uneven thickness, which causes a difficulty in manufacture especially when the motor is miniaturized. Furthermore, vibration may occur in the thrust direction due to the multi-polarized magnets one of which is formed on the rotation side and the other on the fixed side.

Japanese Unexamined Patent Application Publication No. 2011-211825 and DE 10 2008 061 117 A1 disclose no effective solutions to the above-described problems.

The present disclosure is related to providing an inner-rotor motor that has a structure with which simplification and miniaturization can be achieved, and that can hold a rotational position with a high holding force.

SUMMARY

According to an aspect of the present disclosure, an inner-rotor motor comprises an armature assembly, a frame assembly, and an urging structure. The armature assembly includes a rotating shaft, an armature unit coupled to the rotating shaft and a pressing unit. The frame assembly includes a frame housing the armature unit, a first bearing unit located on one side with respect to the armature unit in an axial direction and a second bearing unit located on another side with respect to the armature unit in the axial direction. The urging structure urges the rotating shaft in a direction away from the second bearing unit and presses the pressing unit toward the first bearing unit.

It is preferable that a supporting member is fixed at a part of the rotating shaft between the second bearing unit and the armature unit, the urging structure includes a coil spring arranged in a compressed state between the supporting member and the second bearing unit, and the pressing unit is pressed, with the coil spring, toward the first bearing unit.

It is preferable that the coil spring is coupled to the supporting member, a pressing member is arranged displaceably in the axial direction between the coil spring and the second bearing unit, and the coil spring presses, against the second bearing unit, the pressing member.

It is preferable that the coil spring is coupled to the frame assembly, the pressing member is arranged displaceably in the axial direction between the coil spring and the supporting member, and the coil spring presses, against the supporting member, the pressing member.

It is preferable that a supporting member is fixed at a part of the rotating shaft between the second bearing unit and the armature unit, the urging structure includes a first urging magnet arranged on the supporting member side and a second urging magnet arranged on the second bearing unit side with respect to the first urging magnet, the second urging magnet faces the first urging magnet, and the pressing unit is pressed toward the first bearing unit with a repulsive force generated between the first urging magnet and the second urging magnet.

It is preferable that the first urging magnet is arranged at the supporting member, and the second urging magnet is displaceably arranged at the supporting member in the axial direction, and the second urging magnet is pressed against the second bearing unit by the repulsive force.

It is preferable that the inner-rotor motor is a brushed motor, and the supporting member is a commutator.

It is preferable that the inner-rotor motor further includes a sliding washer that is arranged between the second bearing unit and the supporting member, and that is rotatable around the rotating shaft with respect to the second bearing unit.

It is preferable that the pressing unit is pressed against the first bearing unit via a sliding washer.

The present disclosure can provide an inner-rotor motor that has a structure with which simplification and miniaturization can be achieved, and that can hold a rotational position with a high holding force.

BRIEF DESCRIPTION OF THE DRAWINGS

FIG. 1 is a sectional view of an inner-rotor motor according to a first embodiment of the present disclosure.

FIG. 2 is a sectional view of an inner-rotor motor according to a second embodiment of the present disclosure.

FIG. 3 is a sectional view of an inner-rotor motor according to a third embodiment of the present disclosure.

FIG. 4 is a side view of a commutator according to the third embodiment, the side view being seen from an axial direction.

DETAILED DESCRIPTION

In the following, inner-rotor motors according to embodiments of the present disclosure will be described.

EMBODIMENTS

First Embodiment

FIG. 1 is a sectional view of an inner-rotor motor 1 according to a first embodiment of the present disclosure.

In FIG. 1, the right-left direction may also be referred to as an axial direction.

As illustrated in FIG. 1, the inner-rotor motor (hereinafter also referred to simply as motor) 1 mainly includes a frame assembly 1a and an armature assembly (hereinafter also referred to simply as armature) 1b that is supported in a manner that the armature assembly 1b is rotatable with respect to the frame assembly 1a. The motor 1 is a so-called brushed direct current (DC) motor.

The armature assembly 1b includes, for example, a rotating shaft (shaft) 2, an armature unit 4, and a commutator 30.

The armature unit 4 is coupled to the rotating shaft 2. The armature unit 4 includes, for example, an armature core 5 with a plurality of salient poles protruding in radial directions, and windings (not illustrated) wound around the respective salient poles.

The commutator 30 is provided near one end portion of the rotating shaft 2 (near a bottom portion). The commutator 30 has commutator segments (not illustrated) connected to the windings.

The frame assembly 1a includes, for example, a frame 10, a bracket 12, a plate 13, and a magnet 8.

The frame 10 has a cylindrical shape that is closed at one end portion (a left-side region, which may also be referred to as a top portion, in FIG. 1) such that the rotating shaft 2 protrudes from the frame 10. An opening portion of the other end portion (an end portion at a right side in FIG. 1, which may also be referred to as a bottom portion) of the frame 10 is closed by the plate 13. The armature 1b is housed inside the frame 10, and the bottom portion of the frame 10 is formed by the plate 13. A housing in which the armature unit 4 is housed is thus formed. One end portion of the rotating shaft 2 protrudes from the top portion of the frame 10. Power generated by the motor 1 can be extracted to the outside via the protruding portion of the rotating shaft 2.

A first bearing unit 21 is held at a central section of the top portion of the frame 10. A second bearing unit 26 is held at a central section of the plate 13, That is, the first bearing unit 21 is located on one side with respect to the armature unit 4 in the axial direction, and the second bearing unit 26 is located on the other side with respect to the armature unit 4 in the axial direction. The rotating shaft 2 is rotatably supported with the first bearing unit 21 and the second bearing unit 26 (which may also be referred to as a bearing 21 and a bearing 26), at the two positions. The armature 1b is held by the bearings 21 and 26 rotatably with respect to the frame 10.

A bracket unit 20 includes the plate 13, the bracket 12, the second bearing unit 26, as well as terminals and brushes that are not illustrated. The bracket 12 is attached to an inner side of the plate 13. The bracket 12 holds the terminals and a current is supplied from the outside via the terminals. The brushes are respectively coupled to the terminals at a end portion of each of the terminals. Each of the brushes is arranged such that a end portion of the brush is brought into contact with the commutator 30 of the armature 1b. The motor 1 is driven when power is supplied to the commutator 30 segments on the commutator 30 through the brushes.

In the present embodiment, the motor 1 has an urging structure 40 that urges the rotating shaft 2 on one side in the axial direction. The urging structure 40 is provided inside the frame assembly 1a of the motor 1 between the second bearing unit 26 and the armature unit 4. A pressing unit 2a having a size in a radial direction larger than that of a portion of the rotating shaft 2 supported with the first bearing unit 21 is provided at a region of the rotating shaft 2 between the armature unit 4 and the first bearing unit 21. A washer 51 is arranged on the first bearing unit 21 side with respect to the pressing unit 2a. The washer 51 is rotatable together with the rotating shaft 2. Note that the washer 51 may be press-fit onto the rotating shaft 2, or may also be arranged so as to be loosely fit around the rotating shaft 2. The urging structure 40 urges the rotating shaft 2 in a direction away from the second bearing unit 26 (leftward in FIG. 1). As a result, the pressing unit 2a is pressed together with the washer 51 toward the first bearing unit 21.

The urging structure 40 includes a coil spring 41 as a spring and a washer (an example of a pressing member) 56. The coil spring 41 is arranged between the commutator 30 and the second bearing unit 26, the commutator 30 serving as a supporting member when the rotating shaft 2 is urged. The washer 56 is arranged between the coil spring 41 and the second bearing unit 26. The washer 56 is loosely fit around the rotating shaft 2, and is arranged so as to be displaceable in the axial direction.

The coil spring 41 is arranged such that an axis of the coil spring 41 substantially matches the axis of the rotating shaft 2. The coil spring 41 is arranged in a compressed state between the commutator 30 and the washer 56. Note that, in the present embodiment, a recess portion 33 is formed in an end face of the commutator 30 facing the second bearing unit 26, and a portion of the coil spring 41 is placed in the recess portion 33 in the axial direction. One end portion of the coil spring 41 in the axial direction is placed in the recess portion 33. Since the coil spring 41 is arranged in the recess portion 33 in this manner, a space required for arranging the coil spring 41 inside the motor 1 can be reduced, and thus the size in the axial direction of the motor 1 can be reduced. Since the coil spring 41 is coupled to the commutator 30 in this manner, the coil spring 41 rotates together with the rotating shaft 2 and the commutator 30.

The coil spring 41 tries to expand from the compressed state between the commutator 30 and the washer 56. This restoring force acts to increase the space between the commutator 30 and the washer 56. That is, the coil spring 41 presses, with the restoring force of the coil spring, the pressing unit 2*a* together with the washer 51 toward the first bearing unit 21. In addition, the coil spring 41 presses, with the restoring force of the coil spring, the washer 56 toward the second bearing unit 26.

A sliding washer 61 is arranged between the first bearing unit 21 and the washer 51. The sliding washer 61 is loosely fit around the rotating shaft 2. The sliding washer 61 is rotatable around the rotating shaft 2 with respect to the rotating shaft 2 and is rotatable around the rotating shaft 2 with respect to the first bearing unit 21. The sliding washer 61 is displaceable in the axial direction. The washer 51 is pressed against the first bearing unit 21 via the sliding washer 61. In the present embodiment, the quantity of the sliding washer 61 is one, but a plurality of sliding washers may also be used.

A sliding washer 66 is arranged between the second bearing unit 26 and the washer 56. The sliding washer 66 is loosely fit around the rotating shaft 2. The sliding washer 66 is rotatable around the rotating shaft 2 with respect to the rotating shaft 2 and is rotatable around the rotating shaft 2 with respect to the second bearing unit 26. The sliding washer 66 is displaceable in the axial direction. The washer 56 is pressed against the second bearing unit 26 via the sliding washer 66. In the present embodiment, the quantity of the sliding washer 66 is only one, but a plurality of sliding washers may also be used.

The bearings 21 and 26 are, for example, metal bearings (oil retaining bearings). End faces of the bearings 21 and 26 facing the armature unit 4 are respectively flat and smooth surfaces perpendicular to the rotating shaft 2. The sliding washer 61 is slidable around the rotating shaft 2 with respect to each of the end face of the first bearing unit 21 and the end face of the washer 51 while the sliding washer 61 is sandwiched between the first bearing unit 21 and the washer 51. Likewise, the sliding washer 66 is slidable around the rotating shaft 2 with respect to each of the end face of the second bearing unit 26 and the end face of the washer 56 while the sliding washer 66 is sandwiched between the second bearing unit 26 and the washer 56.

In this manner, in the present embodiment, the urging structure 40 including the coil spring 41 is arranged on or above the armature 1*b* side and the urging structure 40 applies a thrust load in the axial direction to the first bearing unit 21 and the second bearing unit 26. As a result, a holding torque against the rotation of the armature 1*b* is obtained based on the friction force corresponding to the applied thrust load, the coefficients of friction of surfaces to which the thrust load is applied, and the areas of the surfaces to which the thrust load is applied. That is, a holding torque due to a static friction force or a holding torque due to a torque loss is obtained between the end face of the first bearing unit 21 and the sliding washer 61, between the sliding washer 61 and the washer 51, between the washer 56 and the sliding washer 66, and between the sliding washer 66 and the end face of the second bearing unit 26. With no rotating torque being applied, the rotational position of the armature 1*b* can be maintained due to the effect of such a holding torque against an external force applied to the rotating shaft 2.

When the motor 1 rotates, the sliding washer 61 slides around the rotating shaft 2 with respect to each of the end face of the first bearing unit 21 and the end face of the washer 51. In addition, the sliding washer 66 slides around the rotating shaft 2 with respect to each of the end face of the second bearing unit 26 and the end face the washer 56. The motor 1 is thus smoothly rotatable. Note that the members that slide with respect to the sliding washers 61 and 66 do not have to be all of the bearings 21 and 26 and washers 51 and 56, and may vary as appropriate depending on the rotation status of the motor 1.

The holding torque of the motor 1 can be generated with a simple structure in which, for example, the coil spring 41, the washers 51 and 56, and the sliding washers 61 and 66 are provided inside the motor 1. Since the structure of the motor 1 can be simplified, the manufacturing cost of the motor 1 can be reduced. For many use applications in which the speed of the motor 1 is reduced by using for example a reduction gear, simply by producing a small holding torque on the motor 1-side, a holding force equivalent to the holding torque generated in the case where a holding mechanism is provided after a speed reduction mechanism can be generated. Thus, the structure of a system using the motor 1 can be miniaturized or simplified. In addition, the reliability of the system using the motor 1 can be increased.

Second Embodiment

The basic structure of a motor according to a second embodiment is the same as that described in the first embodiment, and thus the description thereof will not be repeated here. Members having substantially the same functions as those described in the first embodiment will be denoted by the same reference numerals used in the first embodiment, and a specific description thereof may be omitted. Similarly to the first embodiment, an urging structure includes a coil spring and washers. The second embodiment differs from the first embodiment in, for example, the position at which the urging structure is provided, and an urging direction. In the second embodiment, the coil spring is provided on the fixed body side, namely on a frame assembly side.

FIG. 2 is a sectional view of an inner-rotor motor 201 according to the second embodiment.

In FIG. 2, the right-left direction may also be referred to as an axial direction. The motor 201 has a frame assembly 201*a* and an armature 201*b*.

As illustrated in FIG. 2, a second bearing unit 226 is held at a central section of the top portion of the frame 10 in the frame assembly 201*a*. In contrast, a first bearing unit 221 is held at a central section of the plate 13. The rotating shaft 2 of the armature 201b is rotatably supported with the first bearing unit 221 and the second bearing unit 226.

A fixed member 250 is fixed at an inner side of the top portion of the frame 10. Similarly to the recess portion 33 according to the first embodiment above, a recess portion 253 is formed in the fixed member 250, and the coil spring 41 is placed in the recess portion 253. The recess portion 253 is formed in an annular shape substantially coaxially to the rotating shaft 2 and is open toward the first bearing unit 221.

One end portion in the axial direction of the coil spring 41 is placed in the recess portion 253. That is, the coil spring 41 is coupled to the frame assembly 201a in a manner that the coil spring 41 does not rotate with respect to the frame assembly 201a.

In the second embodiment, the armature 201b has a commutator 230 and a supporting member 235 having a structure different from that according to the first embodiment.

Unlike the commutator 30 according to the first embodiment, the commutator 230 has neither the recess portion 33 nor the coil spring 41 placed therein. The commutator 230 serves as a pressing unit that is to be pressed toward the first bearing unit 221 when the rotating shaft 2 is urged as described below. The washer 51 is arranged between the commutator 230 and the first bearing unit 221. The washer 51 is rotatable together with the rotating shaft 2. Note that the washer 51 may be press-fit onto the rotating shaft 2, or may also be arranged so as to be loosely fit around the rotating shaft 2.

The supporting member 235 is arranged between the armature unit 4 and the second bearing unit 226. The supporting member 235 includes a thrust holder 238 that protrudes from the armature unit 4 toward the top portion, and a bearing member 236.

The bearing member 236 is, for example, an oil-impregnated sintered metal product. The thrust holder 238 is, for example, a resin product, and is connected to the armature unit 4. The bearing member 236 is press-fit onto the rotating shaft 2. The thrust holder 238 and the bearing member 236 rotate together with the rotating shaft 2. The thrust holder 238 has a bowl shape that is open toward the second bearing unit 226, and the bearing member 236 is arranged inside the thrust holder 238. Since an outer periphery of the bearing member 236 is covered with the thrust holder 238, the flight of oil included in the bearing member 236 is prevented due to a centrifugal force occurring when the armature 201b rotates.

In the second embodiment, an urging structure 240 includes the coil spring 41 coupled to the fixed member 250, and the washer (an example of a pressing member) 56. The washer 56 is arranged between the coil spring 41 and the bearing member 236 of the supporting member 235. The washer 56 is loosely fit around the rotating shaft 2, and is arranged so as to be displaceable in the axial direction. The coil spring 41 is arranged in a compressed state between the supporting member 235 and the fixed member 250 (that is, between the supporting member 235 and the second bearing unit 226).

The urging structure 240 urges, with the restoring force of the coil spring 41, the rotating shaft 2 in a direction away from the second bearing unit 226 (rightward in FIG. 2). That is, the coil spring 41 presses the commutator 230 together with the washer 51 toward the first bearing unit 221. In addition, the coil spring 41 presses the washer 56 toward the bearing member 236.

Similarly to the first embodiment, the sliding washer 61 is arranged between the first bearing unit 221 and the washer 51. That is, the commutator 230 is pressed against the first bearing unit 221 via the sliding washer 66. The sliding washer 61 is slidable around the rotating shaft 2 with respect to each of the end face of the first bearing unit 221 and the end face of the washer 51 while the sliding washer 61 is sandwiched between the first bearing unit 221 and the washer 51. In addition, similarly to the first embodiment, the sliding washer 66 is arranged between the bearing member 236 and the washer 56. The sliding washer 66 is slidable around the rotating shaft 2 with respect to each of an end face of the bearing member 236 and an end face of the washer 56 while the sliding washer 61 is sandwiched between the bearing member 236 and the washer 56. That is, in a state in which the washers 51 and 56 are each urged by the urging structure 240, the sliding washers 61 and 66 act similarly to those described in the first embodiment between the first bearing unit 221 and the washer 51 and between the bearing member 236 and the washer 56.

In this manner, in the second embodiment, the urging structure 240 including the coil spring 41 is arranged on the frame assembly 201a-side, and the urging structure 240 applies an axial thrust load to the first bearing unit 221 and the bearing member 236. Thus, a holding torque due to a static friction force or a holding torque due to a torque loss is obtained between the end face of the first bearing unit 221 and the sliding washer 61, between the sliding washer 61 and the washer 51, between the washer 56 and the sliding washer 66, and between the sliding washer 66 and the end face of the bearing member 236. Therefore, effects substantially the same as those described in the first embodiment are also obtained in the second embodiment.

Since the coil spring 41 is arranged on the fixed body side in the second embodiment, the structure of the commutator 230 can be made simpler.

Third Embodiment

The basic structure of a motor according to a third embodiment is the same as that described in the first embodiment, and thus the description thereof will not be repeated here. Members having substantially the same functions as those described in the first embodiment will be denoted by the same reference numerals used in the first embodiment, and a specific description thereof may be omitted. The third embodiment differs from the first embodiment in that, for example, an urging structure includes a pair of urging magnets.

FIG. 3 is a sectional view of an inner-rotor motor 301 according to the third embodiment.

In FIG. 3, the right-left direction may also be referred to as an axial direction. As illustrated in FIG. 3, the motor 301 has the frame assembly 1a configured substantially the same as that described in the first embodiment, and an armature 301b. The structure of the motor 301 on the top-portion side with respect to the armature unit 4 (a leftward portion of FIG. 3) is substantially the same as that described in the first embodiment.

A commutator 330 is used instead of the commutator 30 in the armature 301b. The commutator 330 is fixed to the rotating shaft 2.

In the third embodiment, the motor 301 has an urging structure 340 that urges the rotating shaft 2 toward one direction along the axial direction. The urging structure 340 is provided between the second bearing unit 26 and the armature unit 4 inside the frame assembly 1a. Similarly to the urging structure 40 according to the first embodiment, the urging structure 340 urges the rotating shaft 2 in a direction away from the second bearing unit 26 (leftward in FIG. 3). As a result, the pressing unit 2a is pressed together with the washer 51 toward the first bearing unit 21.

More specifically, the urging structure 340 is arranged between the commutator 330 and the second bearing unit 26. The commutator 330 serves as a supporting member when the urging structure 340 urges the rotating shaft 2.

The urging structure 340 includes a first urging magnet 341 and a second urging magnet 342. The first urging magnet 341 is arranged on the side where the commutator 330 is provided, and the second urging magnet 342 is arranged on the second bearing unit 26 side with respect to the first urging magnet 341. The first urging magnet 341 and the second urging magnet 342 are each a permanent magnet magnetized in a two-pole polarized manner in the axial direction.

The commutator 330 has a protruding portion 333 that protrudes from an end face facing toward the second bearing unit 26 of the commutator 330 in the axial direction. The first urging magnet 341 and the second urging magnet 342 are arranged at the commutator 330 such that the protruding portion 333 penetrates through opening portions provided at a central sections of the first urging magnet 341 and the second urging magnet 342. The first urging magnet 341 and the second urging magnet 342 are arranged such that the same poles face each other.

FIG. 4 is a side view of the commutator 330 according to the third embodiment seen in the axial direction.

As illustrated in FIG. 4, the commutator 330 is formed in a substantially cylindrical shape, and has a cylindrical portion 330a and commutator risers 330b. The cylindrical portion 330a has a side peripheral surface where commutator segments (not illustrated) are arranged, and each of the commutator risers 330b is bound with a conducting wire of a coil connected to a corresponding one of the commutator segments. In the third embodiment, the protruding portion 333 protruding from the cylindrical portion 330a has, for example, a polygonal prism shape such as a hexagonal prism shape. The first urging magnet 341 and the second urging magnet 342 have opening portions that fit the shape of the protruding portion 333 and that are in the shape of, for example, a polygon such as a hexagon, the opening portions having a size that loosely fits around the protruding portion 333. As a result, both the first urging magnet 341 and the second urging magnet 342 are displaceable in the axial direction and are coupled to the commutator 330 in a state that the first urging magnet 341 and the second urging magnet 342 are rotatable together with the commutator 330. Note that the first urging magnet 341 may also be press-fit onto the protruding portion 333.

Returning to FIG. 3, the first urging magnet 341 is supported with an end face of the cylindrical portion 330a of the commutator 330. In addition, the sliding washer 66 is arranged between the second urging magnet 342 and the end face of the second bearing unit 26.

The first urging magnet 341 and the second urging magnet 342 are arranged such that the same poles face each other, and thus a magnetic repulsive force acts between the first urging magnet 341 and the second urging magnet 342. The urging structure 340 presses, with the repulsive force, the pressing unit 2a and the washer 51 toward the first bearing unit 21 via the sliding washer 61. In addition, the urging structure 340 presses, with the repulsive force, the second urging magnet 342 itself toward the second bearing unit 26 via the sliding washer 66. An end face of the second urging magnet 342 has a flat and smooth surface perpendicular to the axial direction, the end face facing toward the second bearing unit 26.

The sliding washer 61 is slidable around the rotating shaft 2 with respect to each of the end face of the first bearing unit 21 and the washer 51 while the sliding washer 61 is sandwiched between the first bearing unit 21 and the washer 51. In addition, the sliding washer 66 is slidable around the rotating shaft 2 with respect to each of the end face of the second bearing unit 26 and the end face of the second urging magnet 342 while the sliding washer 66 is sandwiched between the second bearing unit 26 and the second urging magnet 342. Namely, in a state that the washer 51 and the second urging magnet 342 are each urged by the urging structure 340, the sliding washers 61 and 66 act similarly to those described in the first embodiment between the first bearing unit 21 and the washer 51 and between the second bearing unit 26 and the second urging magnet 342.

In this manner, in the third embodiment, the urging structure 340 in which a repulsive force occurs between the same magnetic pole surfaces of the first and second urging magnets 341 and 342 is used to apply an axial thrust load to the first bearing unit 21 and the second bearing unit 26. Thus, a holding torque due to a static friction force or a holding torque due to a torque loss is obtained between the end face of the first bearing unit 21 and the sliding washer 61, between the sliding washer 61 and the washer 51, between the second urging magnet 342 and the sliding washer 66, and between the sliding washer 66 and the end face of the second bearing unit 26. Therefore, effects substantially the same as those described in the first embodiment are also obtained in the third embodiment.

In addition, since the coil springs as described in the first and second embodiments are not used in the third embodiment, the structure of the motor 301 can be simplified, and the manufacturing man-hour of the motor 301 can be reduced. Furthermore, the possibility of occurrence of noise or the like due to a coil spring can be reduced by using a preload pressure generated in a noncontact manner.

Other Embodiments

An inner-rotor motor may also be configured by combining, as appropriate, characteristic portions of the embodiments described above. In either case, a rotational position can be maintained in a simply structured motor by using an urging structure by which a pressing unit of an armature assembly is pressed toward a first bearing unit. For example, in the case where an urging structure is configured to prevent rotation thereof as a rotating shaft rotates as described in the second embodiment described above, the urging structure may also include a pair of urging magnets as described in the third embodiment. Specifically, in a motor having a structure as described in the second embodiment, it is sufficient that a configuration be adopted in which a second urging magnet is coupled to a fixed member coupled to a frame assembly, and a first urging magnet is displaceable in the axial direction and pressed against a supporting member with a repulsive force between the urging magnets. As a result, a holding torque can be generated by pressing a commutator against the first bearing unit via a sliding washer. Furthermore, the first urging magnet may be prevented from rotating around the rotating shaft with respect to the fixed member by using the first urging magnet and the fixed member that have portions formed in a polygonal shape and that fit loosely to each other as described in the third embodiment above, and a holding torque may be generated also between the supporting member and the first urging magnet.

Another sliding member may be used instead of the sliding washer. Alternatively, no sliding washer or the like is used, and the first bearing unit and the pressing unit of the armature assembly may face each other, or the second bearing unit and a pressing member may face each other.

In the first and third embodiments described above, each urging structure may not rotate together with the commutator but may be coupled to the bracket or plate in a manner that the urging structure does not rotate with respect to the frame assembly. In the case where an urging structure using a coil spring is used, a holding torque can be generated similarly to the second embodiment by pressing a pressing member such as a washer against an end face of a commutator, and pressing a pressing unit of an armature assembly against a first bearing unit, the pressing being performed by using the coil spring. In the case where an urging structure using a pair of urging magnets is used, a holding torque can be generated similarly to the second embodiment by pressing, against an end face of a commutator, a first urging magnet arranged in a manner that the first urging magnet does not rotate with respect to a frame assembly and the first urging magnet is displaceable in the axial direction, and pressing a pressing unit of an armature assembly against a first bearing unit.

Urging structures that may be used are not limited to the urging structures using the coil springs and the urging structure using the urging magnets as described in the embodiments above. Various configurations may be used with which a rotating shaft is pressed toward a first bearing member. For example, an urging structure may include a spring of a different type or may be configured to use a magnetic attraction force such that a rotating shaft is urged.

Motors that may be used are not limited to the brushed inner-rotor motors described above, and a brushless inner-rotor motor or an inner-rotor motor of a different type may also be used.

The embodiments described above are mere examples, and should not be construed as limitations in any aspect. The scope of the present disclosure is determined not by the description above but by its claims, and it is intended that all modifications within the scope of equivalents of the claims and the claims are included in the scope of the present disclosure.

What is claimed is:

1. A motor comprising:
a rotating shaft;
an armature unit coupled to the rotating shaft;
a first bearing unit located on a first side in an axial direction of the rotating shaft;
a second bearing unit located on a second side in the axial direction of the rotating shaft;
a frame assembly including a first magnet and a frame holding the first bearing unit and the second bearing unit; and
an urging structure urging the rotating shaft from one of the first bearing unit and the second bearing unit to other of the first bearing unit and the second bearing unit,
wherein:
the second bearing unit is a metal bearing,
the urging structure includes a second magnet and a sliding member,
the second magnet is arranged between the armature unit and the second bearing unit,
the sliding member is arranged between the second magnet and the second bearing unit,
the sliding member is slidable with respect to the second bearing unit and the second magnet, and
the rotating shaft is urged by a magnetic attraction force of the urging structure.

2. The motor according to claim 1, wherein
a holding torque is generated between the sliding member and the second bearing unit against a rotation of the armature unit.

3. The motor according to claim 2, comprising
a commutator, wherein
the holding torque is generated between the sliding member and the second bearing unit against a rotation of the armature unit.

4. The motor according to claim 1, comprising a supporting member coupled to the rotating shaft, wherein
the supporting member supports the second magnet.

5. The motor according to claim 1, wherein
a part of the supporting member includes a polygonal prism shape, and
the second magnet is coupled to the part of the supporting member.

6. The motor according to claim 5, wherein
the part of the supporting member is a protruding portion protruding toward the second bearing unit.

7. The motor according to claim 5, wherein
the supporting member is a commutator.

* * * * *